R. F. GRANT & H. E. WETHERBEE.
VEHICLE SPRING SUSPENSION.
APPLICATION FILED NOV. 8, 1912.
1,071,517.
Patented Aug. 26, 1913.
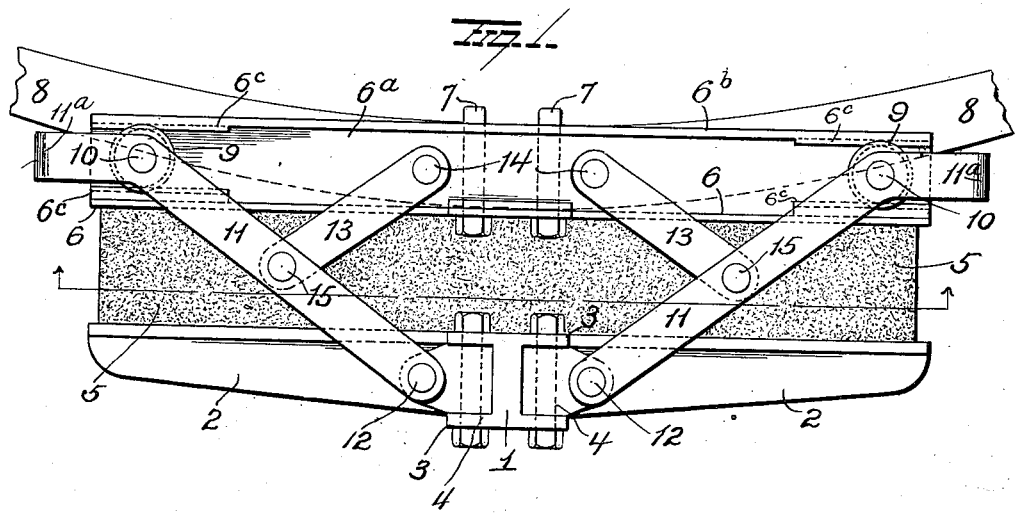
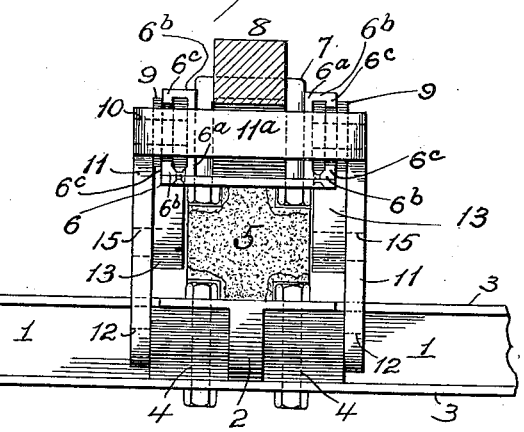
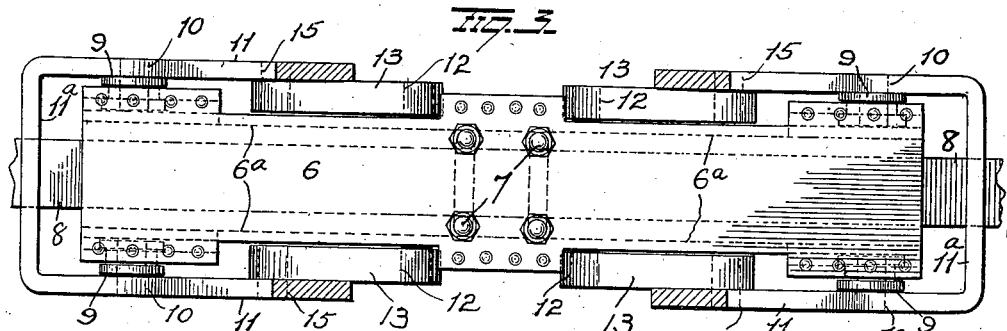
WITNESSES
INVENTORS
R. F. Grant and
H. E. Wetherbee
By H. A. Seymour
Attorney

UNITED STATES PATENT OFFICE.

RICHARD F. GRANT AND HERBERT E. WETHERBEE, OF CLEVELAND, OHIO, ASSIGNORS OF ONE-THIRD TO HOWARD M. HANNA, JR., OF CLEVELAND, OHIO.

VEHICLE SPRING SUSPENSION.

1,071,517.  Specification of Letters Patent.  Patented Aug. 26, 1913.

Application filed November 8, 1912. Serial No. 730,290.

*To all whom it may concern:*

Be it known that we, RICHARD F. GRANT and HERBERT E. WETHERBEE, of Cleveland, in the county of Cuyahoga and State of Ohio, have invented certain new and useful Improvements in Vehicle Spring Suspension; and we do hereby declare the following to be a full, clear, and exact description of the invention, such as will enable others skilled in the art to which it appertains to make and use the same.

Our invention relates to an improvement in vehicle spring suspension and its object is to so mount the body carrying springs of the vehicle upon the running gear, that shocks received by the running gear will be wholly or partly absorbed before reaching the body carrying springs.

A further object is to so connect the axle and the seat carrying the body carrying spring, that the seat will have a perfectly free vertical movement but will be positively restrained against longitudinal or sidewise motion.

With these and other objects in view our invention consists broadly in an axle, a resilient device thereon, a spring seat on said resilient device and a flexible coupling connecting the axle and spring seat whereby the latter will be free to move vertically, but will be held against movement in all other directions.

Our invention further consists in the details of construction and combinations of parts as will be more fully described and pointed out in the claims.

In the accompanying drawings, Figure 1 is a view in side elevation of our improvement; Fig. 2 is an end view of the same, and Fig. 3 is a bottom plan view of the spring seat.

In the drawings we have shown only one spring, but it should be understood that the improvement may be applied to each spring on the vehicle. These springs may be at the four corners of the vehicle body, and at right angles to or crosswise the axles as shown, but when only two springs are used, one on the front and the other on the rear axle, they will of course be located centrally and in the plane of the axles.

1 represents the axle, which in the present instance is of I-shape in cross section, and 2 are arms the inner ends of which are rigidly bolted to the upper and lower flanges 3 of the axle 1, by the bolts 4. These arms project respectively in front and in rear of the axle, with their upper surfaces preferably in the plane of the top of the axle as shown, so as to form an extended bearing for the resilient carrying member 5. This carrying member 5 may be of rubber in one continuous block or in sections; a pneumatic device or devices; a series of springs or any other device or devices which will give or yield vertically. Located on the top of the carrying member 5 is the spring seat 6, which latter is approximately the length of the two arms 2, and is supported throughout its length, or at intervals throughout its length by the resilient carrying member 5.

Secured to the seat 6 by the clips 7, is the spring 8, only a portion of which is shown. This spring may be elliptic or semi-elliptic in form, and is rigidly secured, as above explained, centrally to the spring seat 6, and between the side members 6ª of the latter. These side members 6ª are provided at their upper and lower edges with outwardly projecting flanges 6ᵇ which latter are provided at their end portion with the oppositely disposed vertical flanges 6ᶜ, which form tracks or guides for the grooved rollers 9, journaled upon the trunnions 10 secured to the upper ends of the links 11. The two links 11 at each end of the spring seat are connected by the integral bar 11ª, which not only prevents any independent movement of any one link of the pair, but they operate to prevent any lateral rocking of the spring seat on its yielding carrying member. The two pairs of links 11 are journaled at their lower ends to the trunnions 12 integral with or rigidly secured to the arms 2. Each link 11 is connected to the side members 6ª of the spring seat 6, by a link 13, each of which is journaled at its upper end on a pin 14 carried by a side member of the spring seat, and at its lower end on a pin 15 carried by its coöperating link 11. The links 13 are connected to the links 11 midway the length of the latter and are just one half the length of the latter, and as the centers of the pins 14 carrying the upper ends of links 13 are in the vertical plane of the centers of the trunnions 12, it will be seen that the links are free to move to permit the spring seat to move vertically, but absolutely prevent any endwise or sidewise movement.

From the foregoing it will be seen that the spring seat 6 rests on a carrying member which is free to yield or give vertically, and is connected to the axle by link couplings which permit it to have free vertical movement but which lock it positively against movement in any other direction.

In the present type of automobile construction, the spring is secured directly to the axle and any shock which reaches the axle is transmitted directly to the spring. In our device the spring is separated from the axle by a resilient support hence any shocks transmitted to the axle will be wholly or partly absorbed by the yielding carrying members, and it is locked to the axle by a coupling which holds the parts in proper relative position and prevents any lateral or longitudinal movement, or unequal compression or expansion of the resilient carrying member.

The coupling as shown is perfectly flexible vertically but is incapable of movement in any other direction, and is positive in the traction between the axle and spring and also against side shocks.

It is evident that many slight changes might be resorted to in the relative arrangement of parts shown and described without departing from the spirit and scope of our invention. Hence we would have it understood that we do not wish to confine ourselves to the exact construction and arrangement of parts shown and described, but Having fully described our invention what we claim as new and desire to secure by Letters-Patent, is:—

1. The combination with an axle, a spring and a spring seat, of a resilient member interposed between the spring and axle, links, each having a pivotal connection with the axle, the said links diverging upwardly and having a sliding connection with the spring seat, and shorter links each pivoted at one end to the spring seat and diverging downwardly and pivoted at their lower ends to the first mentioned links.

2. The combination with an axle, a resilient support therein, a spring seat on said support and a spring rigidly secured to said seat, of two links pivotally connected with the axle and diverging upwardly and having sliding connection with the spring seat, and two shorter links each having pivotal connection with the spring seat and diverging downwardly and pivotally connected to the longer links intermediate the ends of the latter.

3. The combination with an axle, a resilient support thereon, a spring seat on said support, and a spring rigidly secured to said seat, of coupling devices pivoted to the axle and connected with the spring seat adjacent the ends of the latter, and other devices pivoted to the spring seat intermediate the upper ends of said first mentioned coupling devices and pivoted to said first mentioned coupling devices intermediate the ends of the latter.

4. The combination with an axle, a resilient support thereon a spring seat carried by said support and a spring rigidly secured to said seat, of two coupling devices each comprising parallel arms located on opposite sides of the resilient support and having pivotal connection with a part fixed with relation to the axle, and also having loose connection with the spring seat adjacent one end of the latter, and other devices pivoted to the spring seat and to the parallel arms intermediate the ends of the latter.

5. The combination with an axle, a resilient support thereon, a spring seat on said support and provided adjacent its ends with guides, and a spring rigidly secured to said seat, of coupling devices having pivotal connection with the axle, rollers carried by said coupling devices and engaging the guides on the spring seat and other devices pivoted to the spring seat intermediate the guides and also to the coupling devices intermediate the ends of the latter.

6. The combination with an axle, a resilient support thereon, a spring seat on said support and a spring rigidly secured to said seat, the said seat being provided adjacent its ends with guides, of links having pivotal connection at their lower ends with the axle, grooved rollers on said links adapted to engage the guides on the spring seat, and shorter links pivoted to the spring seat and also to the first mentioned links intermediate the rollers and the lower ends of said links.

In testimony whereof, we have signed this specification in the presence of two subscribing witnesses.

RICHARD F. GRANT.
HERBERT E. WETHERBEE.

Witnesses:
SAM. W. FOLSOM,
A. C. HOUSE.

---

Copies of this patent may be obtained for five cents each, by addressing the "Commissioner of Patents, Washington, D. C."